US012683148B2

(12) United States Patent
Yang et al.

(10) Patent No.: US 12,683,148 B2
(45) Date of Patent: *Jul. 14, 2026

(54) POSITIVE ELECTRODE ACTIVE MATERIAL FOR LITHIUM SECONDARY BATTERY, METHOD FOR PRODUCING SAME, AND LITHIUM SECONDARY BATTERY COMPRISING SAME

(71) Applicant: LG ENERGY SOLUTION, LTD., Seoul (KR)

(72) Inventors: Seungbo Yang, Daejeon (KR); Eui Tae Kim, Daejeon (KR); Kwonnam Sohn, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 676 days.

This patent is subject to a terminal disclaimer.

(21) Appl. No.: 17/769,984

(22) PCT Filed: Jan. 12, 2021

(86) PCT No.: PCT/KR2021/000367
§ 371 (c)(1),
(2) Date: Apr. 18, 2022

(87) PCT Pub. No.: WO2021/145633
PCT Pub. Date: Jul. 22, 2021

(65) Prior Publication Data
US 2022/0384788 A1     Dec. 1, 2022

(30) Foreign Application Priority Data
Jan. 14, 2020     (KR) ........................ 10-2020-0004786

(51) Int. Cl.
H01M 4/36 (2006.01)
H01M 4/02 (2006.01)
(Continued)

(52) U.S. Cl.
CPC ......... H01M 4/366 (2013.01); H01M 4/0471 (2013.01); H01M 4/38 (2013.01);
(Continued)

(58) Field of Classification Search
CPC ...... H01M 4/366; H01M 4/0471; H01M 4/38; H01M 4/583; H01M 10/0525; H01M 2004/021; H01M 2004/028
See application file for complete search history.

(56) References Cited

U.S. PATENT DOCUMENTS

2013/0171339 A1     7/2013   Wang et al.
2014/0234723 A1     8/2014   Hagen et al.
(Continued)

FOREIGN PATENT DOCUMENTS

CN     104157879 A     11/2014
CN     107768643 A     3/2018
(Continued)

OTHER PUBLICATIONS

KR20190125935A Machine Translation (Year: 2019).*
(Continued)

*Primary Examiner* — Brian R Ohara
*Assistant Examiner* — Quintin D. Elliott
(74) *Attorney, Agent, or Firm* — Birch, Stewart, Kolasch & Birch, LLP

(57) ABSTRACT

A positive electrode active material having a core/shell structure, which includes a sulfur-carbon composite containing thermally expanded-reduced graphene oxide, a carbon material as a core, and carbon nanotubes as a shell. A method for preparing a positive electrode active material having a core/shell structure for a lithium secondary battery, including the steps of thermally expanding graphene oxide by heat treatment at a temperature in a range of 300° C. to 500° C. to prepare a thermally-expanded graphene oxide. Then,
(Continued)

reducing the thermally-expanded graphene oxide by heat treatment at a temperature in a range of 700° C. to 1200° C. to prepare a thermally expanded-reduced graphene oxide. Next, mixing the thermally expanded-reduced graphene oxide and sulfur to prepare a sulfur-carbon composite. Last, mixing the sulfur-carbon composite and carbon nanotubes to form carbon nanotubes on a surface of the sulfur-carbon composite.

12 Claims, 2 Drawing Sheets

(51) Int. Cl.

| | |
|---|---|
| *H01M 4/04* | (2006.01) |
| *H01M 4/38* | (2006.01) |
| *H01M 4/583* | (2010.01) |
| *H01M 10/0525* | (2010.01) |

(52) U.S. Cl.
CPC ....... *H01M 4/583* (2013.01); *H01M 10/0525* (2013.01); *H01M 2004/021* (2013.01); *H01M 2004/028* (2013.01)

(56) References Cited

U.S. PATENT DOCUMENTS

| | | | |
|---|---|---|---|
| 2015/0175425 A1* | 6/2015 | Pauzauskie | C01B 32/336 |
| | | | 977/734 |
| 2015/0221935 A1* | 8/2015 | Zhou | H01M 4/366 |
| | | | 427/221 |
| 2015/0340688 A1 | 11/2015 | Rhee et al. | |
| 2019/0027793 A1 | 1/2019 | Joo et al. | |
| 2019/0115587 A1* | 4/2019 | Manthiram | H01M 4/625 |
| 2021/0122886 A1 | 4/2021 | Naruhashi et al. | |
| 2021/0234159 A1 | 7/2021 | Kim et al. | |

FOREIGN PATENT DOCUMENTS

| | | | | |
|---|---|---|---|---|
| CN | 107902641 | A | | 4/2018 |
| CN | 108886136 | A | | 4/2026 |
| CN | 110520938 | A | | 4/2026 |
| JP | 2013-139377 | A | | 7/2013 |
| JP | 2013-214482 | A | | 10/2013 |
| JP | 2019-510337 | A | | 4/2019 |
| KR | 10-2015-0005819 | A | | 1/2015 |
| KR | 10-2015-0135961 | A | | 12/2015 |
| KR | 10-2018-0057360 | A | | 5/2018 |
| KR | 10-1957248 | B1 | | 3/2019 |
| KR | 10-1959587 | B1 | | 3/2019 |
| KR | 10-1977675 | B1 | | 5/2019 |
| KR | 10-2019-0079428 | A | | 7/2019 |
| KR | 10-2019-0083397 | A | | 7/2019 |
| KR | 10-2019-0088330 | A | | 7/2019 |
| KR | 10-2013832 | B1 | | 8/2019 |
| KR | 10-2019-0125935 | A | | 11/2019 |
| KR | 20190125935 | A | * | 11/2019 |
| KR | 10-2020-0003996 | A | | 1/2020 |
| WO | WO 2020/136187 | A1 | | 7/2020 |

OTHER PUBLICATIONS

Li, Nianwu et.at., High-rate lihtium-sulfur batteries promoted by reduced graphene oxide coating, 2011, ChemComm, 48, 4106-4108 (Year: 2011).*

International Search Report (PCT/ISA/210) issued in PCT/KR2021/000367, dated Apr. 26, 2021.

Extended European Search Report for European Application No. 21741798.9, dated Nov. 9, 2022.

Li et al., "High-rate lithium-sulfur batteries promoted by reduced graphene oxide coating," Chemical Communications, vol. 48, No. 34, Feb. 22, 2012, pp. 4106-4108.

Huang et al., "Entrapment of sulfur in hierarchical porous graphene for lithium-sulfur batteries with high rate performance from -40 to 60 degrees celsius," Nano Energy, vol. 2, 2013, pp. 314-321.

* cited by examiner

【Figure 1】
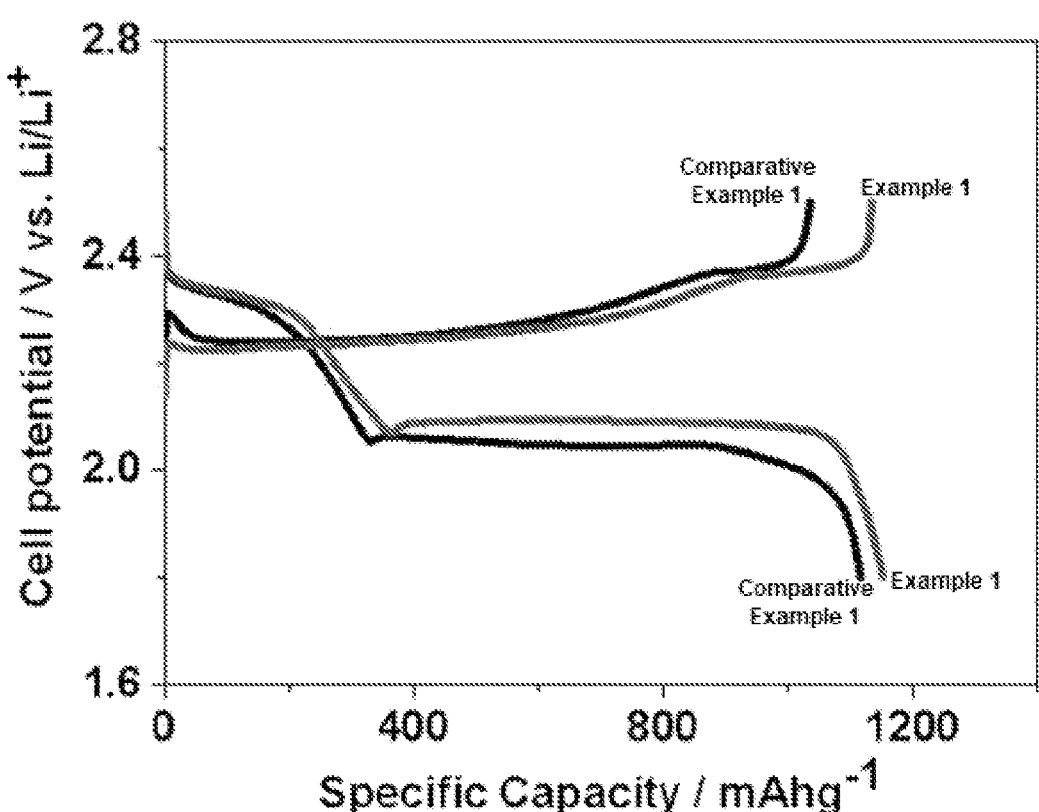

【Figure 2】
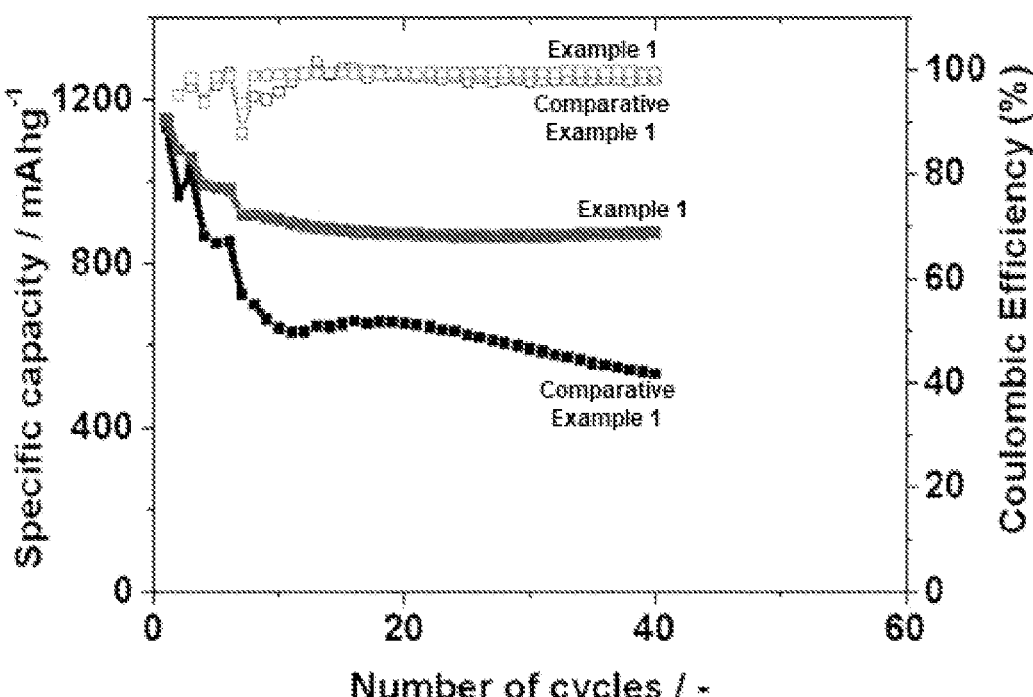

POSITIVE ELECTRODE ACTIVE MATERIAL FOR LITHIUM SECONDARY BATTERY, METHOD FOR PRODUCING SAME, AND LITHIUM SECONDARY BATTERY COMPRISING SAME

TECHNICAL FIELD

The present application claims the benefit of priority based on Korean Patent Application No. 10-2020-0004786 filed on Jan. 14, 2020, all the contents of which is incorporated herein by reference.

The present invention relates to a positive electrode active material for a lithium secondary battery, a preparation method thereof, and a positive electrode for a lithium secondary battery and a lithium secondary battery comprising the same.

BACKGROUND ART

Recently, there is increasing interest in energy storage technology. As the application area thereof extends to the energy for mobile phones, camcorders, notebook PCs, and even electric vehicles, the effort of research and development of electrochemical devices is being carried out more and more concretely.

Electrochemical devices are the most noteworthy area in this respect, and among them, the development of a secondary battery capable of charging/discharging is the focus of attention. Recently, in developing these batteries, research and development on the design of new electrodes and batteries have been conducted in order to improve capacity density and energy efficiency.

Among the secondary batteries currently being applied, the lithium secondary batteries developed in the early 1990s are attracting much attention as there is an advantage in that it has much higher operating voltage and energy density than conventional batteries such as Ni-MH, Ni—Cd, and sulfuric acid-lead batteries using an electrolyte solution in the form of an aqueous solution.

In particular, a lithium-sulfur (Li—S) battery is a secondary battery using a sulfur-based material having a sulfur-sulfur bond (S—S bond) as a positive electrode active material and using lithium metal as a negative electrode active material. There is an advantage that sulfur, which is the main material of the positive electrode active material, is very rich in resources, is not toxic, and has a low atomic weight. In addition, theoretical discharging capacity of the lithium-sulfur battery is 1,675 mAh/g-sulfur, and its theoretical energy density is 2,600 Wh/kg. Since the theoretical energy density of the lithium-sulfur battery is much higher than the theoretical energy density of other battery systems currently under study (Ni-MH battery: 450 Wh/kg, Li—FeS battery: 480 Wh/kg, Li—MnO$_2$ battery: 1,000 Wh/kg, Na—S battery: 800 Wh/kg), the lithium-sulfur battery is the most promising battery among the batteries developed so far.

During the discharging of the lithium-sulfur battery, an oxidation reaction of lithium occurs at the negative electrode and a reduction reaction of sulfur occurs at the positive electrode. Sulfur before discharging has an annular S$_8$ structure. During the reduction reaction (discharging), as the S—S bond is cut off, the oxidation number of S decreases, and during the oxidation reaction (charging), as the S—S bond is re-formed, electrical energy is stored and generated using an oxidation-reduction reaction in which the oxidation number of S increases. During this reaction, the sulfur is converted from the cyclic S$_8$ structure to the linear lithium polysulfide (Li$_2$S$_x$, x=8, 6, 4, 2) by the reduction reaction and eventually, when the lithium polysulfide is completely reduced, lithium sulfide (Li$_2$S) is finally produced. By the process of reducing to each lithium polysulfide, the discharging behavior of the lithium-sulfur battery is characterized by showing the discharge voltage step by step unlike a lithium ion battery.

In order to improve the performance of such a lithium-sulfur battery, the reactivity of the positive electrode active material must be maximized. Since sulfur used as a positive electrode active material of a lithium-sulfur battery has no conductivity, a sulfur-carbon composite mixed with an electrically conductive material is mainly used in order to maximize reactivity. Accordingly, various methods of preparing the sulfur-carbon composite have been proposed, and the methods of preparing the sulfur-carbon composite are mainly a heat treatment method or a sulfur impregnation method using a solution.

In order to maximize the reactivity of the sulfur-carbon composite, a sulfur-carbon composite having a high specific surface area should be prepared. However, if the content of sulfur is increased, the specific surface area and pore volume of the sulfur-carbon composite are reduced, which makes it difficult to provide a sulfur-carbon composite having excellent reactivity.

PRIOR ART DOCUMENT

Patent Document

Korean Patent No. 10-1957248

DISCLOSURE

Technical Problem

As a result of performing various studies, the inventors of the present invention have confirmed that if a thermally expanded-reduced graphene oxide with a large specific surface area is used as the carbon material of the sulfur-carbon composite, and a carbon nanotube is placed on the surface of the sulfur-carbon composite to form a positive electrode active material having a core/shell structure for a lithium secondary battery, the loading amount of sulfur can be increased, the electrical conductivity can be improved, and the transport of lithium ions and electrons can be improved. Accordingly, the inventors of the present invention have completed the present invention by confirming that a lithium secondary battery, preferably a lithium-sulfur battery, comprising the same, has an excellent initial discharging capacity and can increase the discharging capacity in the high-rate section.

Accordingly, it is an object of the present invention to provide a positive electrode active material for a lithium secondary battery, comprising a core containing sulfur-carbon composites and a shell containing carbon nanotubes positioned on the surface of the core.

In addition, it is another object of the present invention to provide a method for preparing the positive electrode active material for the lithium secondary battery and a lithium secondary battery including the same.

Technical Solution

In order to achieve the above objects, the present invention provides a positive electrode active material having a core/shell structure for a lithium secondary battery, which comprises a core containing sulfur-carbon composite; and a shell containing carbon nanotubes on the surface of the core, wherein the sulfur-carbon composite contains thermally expanded-reduced graphene oxide (TE-rGO) and sulfur present on at least a part of the surface of the thermally expanded-reduced graphene oxide and inside of the thermally expanded-reduced graphene oxide.

In addition, the present invention provides a method for preparing a positive electrode active material having a core/shell structure for a lithium secondary battery, which comprises the steps of, (a) thermally-expanding graphene oxide by heat treatment at a temperature in a range of 300 to 500° C. to prepare a thermally-expanded graphene oxide;

(b) reducing the thermally-expanded graphene oxide by heat treatment at a temperature in a range of 700 to 1200° C. to prepare a thermally expanded-reduced graphene oxide;

(c) mixing the thermally expanded-reduced graphene oxide and sulfur to prepare a sulfur-carbon composite; and (d) mixing the sulfur-carbon composite and carbon nanotubes to form carbon nanotubes on the surface of the sulfur-carbon composite.

In addition, the present invention provides a lithium secondary battery comprising a positive electrode, a negative electrode, a separator interposed between the positive electrode and the negative electrode, and an electrolyte solution, wherein the positive electrode comprises the positive electrode active material of the present invention.

Advantageous Effects

As the positive electrode active material having the core/shell structure for the lithium secondary battery of the present invention contains a thermally expanded-reduced graphene oxide having a high specific surface area as a carbon material of the sulfur-carbon composite contained in the core, the loading amount of sulfur can be increased, and as the positive electrode active material includes carbon nanotubes in the shell, the electrical conductivity of the positive electrode active material can be improved, and the transport of lithium ions and electrons can be improved.

Accordingly, a lithium secondary battery comprising the positive electrode active material having the core/shell structure for the lithium secondary battery may exhibit excellent initial discharging capacity, and may exhibit an effect of exhibiting improved discharging capacity in a high-rate section.

DESCRIPTION OF DRAWINGS

FIG. 1 is a graph of a measurement result of the initial discharging capacity of the lithium-sulfur battery of Experimental Example 1.

FIG. 2 is a graph of a measurement result of the lifetime characteristics of the lithium-sulfur battery of Experimental Example 1.

BEST MODE

Hereinafter, the present invention will be described in more detail.

Positive Electrode Active Material Having Core/Shell Structure for Lithium Secondary Battery The present invention relates to a positive electrode active material having a core/shell structure for a lithium secondary battery, more particularly, to a positive electrode active material having a core/shell structure for a lithium secondary battery, which comprises a core containing sulfur-carbon composites; and a shell containing carbon nanotubes positioned on the surface of the core, wherein the sulfur-carbon composite comprises thermally expanded-reduced graphene oxides and sulfur contained in at least a part of the surface and inside of the thermally expanded-reduced graphene oxide.

The sulfur-carbon composite contained in the core comprises thermally expanded-reduced graphene oxide (TE-rGO) as a carbon material.

The thermally expanded-reduced graphene oxide may be prepared by heat-treating graphene oxide to prepare thermally-expanded graphene oxide, and then heat-treating again and thus reducing the thermally-expanded graphene oxide.

In the present invention, the graphene oxide prepared through the thermal expansion and reduction steps as described above is defined as thermally expanded-reduced graphene oxide (TE-rGO).

The thermally expanded-reduced graphene oxide has a crumpled paper structure as it is prepared through thermal expansion and reduction steps.

As it has the crumpled paper structure, it can exhibit a high specific surface area and pore volume.

In general, the ratio of carbon and oxygen in graphene oxide is about 1:1, but in reduced graphene oxide, the ratio of carbon and oxygen changes to about 9:1 due to reduction. The reduced graphene oxide (rGO) does not expand thermally and thus does not have a crumpled paper structure, and has a stacking structure due to reduction and has an oxygen functional group of about 3 to 5% by weight due to chemical reduction.

On the other hand, the thermally expanded-reduced graphene oxide has a crumpled paper structure as oxygen functional groups on the surface of the reduced graphene oxide are removed by thermal expansion. Specifically, as oxygen functional groups in the graphene oxide are removed by heat due to thermal expansion, the thermally expanded-reduced graphene oxide has a crumpled paper structure, and thus has a higher specific surface area and pore volume than those of reduced graphene oxide. In particular, the thermally expanded-reduced graphene oxide may have a specific surface area and pore volume of about twice or more than those of the reduced graphene oxide. That is, when the reduced graphene oxide is thermally expanded, the surface area is increased because it has a crumpled paper structure. Specifically, when the surface area is measured by BET, the specific surface area of the reduced graphene oxide is less than 100 m²/g, but the specific surface area of the thermally expanded-reduced graphene oxide can be measured up to 1200 m²/g.

That is, the specific surface area of the thermally expanded-reduced graphene oxide of the present invention may be 500 to 1200 m²/g, preferably 700 to 1000 m²/g, and the pore volume may be 3 to 7 cm³/g, preferably 4 to 6 cm³/g.

The thermally expanded-reduced graphene oxide can be used as a sulfur loading carrier.

By having the above specific surface area and pore volume, a large amount of sulfur can be evenly loaded onto the thermally expanded-reduced graphene oxide. Therefore, it is possible to realize excellent initial discharging capacity by facilitating the use of sulfur to improve the reactivity of a lithium secondary battery, preferably a lithium-sulfur battery, comprising the same.

The sulfur may be at least one selected from the group consisting of elemental sulfur ($S_8$), an organic sulfur compound, $Li_2S_n(n\geq1)$, and a carbon-sulfur polymer $((C_2S_x)_n$: $x=2.5\sim50$, $n\geq2$). Preferably, the inorganic sulfur ($S_8$) can be used.

In the sulfur-carbon composite contained in the core of the present invention, the thermally expanded-reduced graphene oxide and sulfur are preferably mixed in a weight ratio of 1:1 to 1:9. If the content of the thermally expanded-reduced graphene oxide exceeds the above range, the content of sulfur, which is an active material, is lowered, causing problems in securing battery capacity. If the content of the carbon-based material is less than the above range, the content of the thermally expanded-reduced graphene oxide is insufficient to impart electrical conductivity. Therefore, the content of the porous reduced graphene oxide is properly adjusted within the above range.

The sulfur is loaded on at least part of the surface and the inside of thermally expanded-reduced graphene oxide.

In the present invention, the inside of the thermally expanded-reduced graphene oxide means pores of the thermally expanded-reduced graphene oxide.

The diameter of the sulfur-carbon composite of the present invention is not particularly limited in the present invention, and may be various, but may preferably be 0.1 to 20 μm, and more preferably 1 to 10 μm. When the above range is satisfied, a high loading electrode can be manufactured.

Since the sulfur-carbon composite contains the thermally expanded-reduced graphene oxide of the present invention as a carbon material, a large amount of sulfur can be evenly loaded compared to the conventional reduced graphene oxide. Therefore, a lithium secondary battery comprising the positive electrode active material having a core/shell structure for a lithium secondary battery, which contains a sulfur-carbon composite as a core material, may have an effect of improving initial discharging capacity and lifetime characteristics.

The carbon nanotube is a shell of a core/shell structure, is located on the surface of the core, and preferably coats the surface of the core.

In the present invention, the electrical conductivity of the positive electrode active material can be improved as the carbon nanotube is used as a shell surrounding the sulfur-carbon composite which is a core. In addition, the carbon nanotube has excellent electrical conductivity and open pores. Accordingly, even if the carbon nanotube is placed on the surface of the core, that is, even if the carbon nanotube is coated on the surface of the core, ion transfer is not restricted. Therefore, it is most preferable to use carbon nanotube as a shell material.

The carbon nanotubes located on the surface of the sulfur-carbon composite may contain macro pores and meso pores, and specifically, may contain pores of 2 to 200 nm.

As the pores are contained, the transport characteristics of lithium ions and electrons are improved, and thus the discharging capacity in a high-rate section of the lithium secondary battery, preferably a lithium-sulfur battery, comprising the positive electrode active material of the present invention can be improved.

The carbon nanotube may be contained in an amount of 0.5 to 2 parts by weight, preferably 0.7 to 1.5 parts by weight, based on 100 parts by weight of the sulfur-carbon composite which is a core material. If the carbon nanotube is contained in an amount of less than 0.5 parts by weight, it cannot cover the surface of the core material, sulfur-carbon composite, and thus a positive electrode active material having a core/shell structure cannot be manufactured. If the carbon nanotube exceeds 2 parts by weight, the electrical conductivity may be improved, but there may be a problem that due to excessive use, the entry and exit of the electrolyte are inhibited, so that ion transfer is not easy, and the discharging performance in the high-rate section is deteriorated.

The positive electrode active material having a core/shell structure for a lithium secondary battery of the present invention may be a positive electrode active material for a lithium-sulfur battery.

Method for Preparing Positive Electrode Active Material Having Core/Shell Structure for Lithium Secondary Battery In addition, the present invention relates to a method for preparing the positive electrode active material having a core/shell structure for a lithium secondary battery, more specifically, which comprises the steps of, (a) thermally expanding graphene oxide by heat treatment at a temperature of 300 to 500° C.; and (b) reducing the thermally-expanded graphene oxide by heat treatment at a temperature of 700 to 1200° C. to prepare a thermally expanded-reduced graphene oxide;

(c) mixing the thermally expanded-reduced graphene oxide and sulfur to prepare a sulfur-carbon composite; and (d) mixing the sulfur-carbon composite and carbon nanotube to place the carbon nanotube on the surface of the sulfur-carbon composite.

Step (a) is a step of thermally expanding graphene oxide by heat treatment.

As the heat treatment is performed, the oxygen functional group in the graphene oxide is easily removed, so that thermal expansion of the graphene oxide may easily occur. When the thermal expansion of the graphene oxide occurs, the oxygen functional group in the graphene oxide is removed by thermal shock to form an expanded crumpled paper structure.

The graphene oxide in step (a) may be in a powder form.

Since film-type graphene oxide has a stacked structure, a thermally expanded-reduced graphene oxide having a desired specific surface area cannot be obtained. Therefore, in the present invention, it is preferable to use graphene oxide in powder form.

In addition, the heat treatment may be performed at a temperature of 300 to 500° C. for 5 to 30 minutes, and preferably at a temperature of 350 to 450° C. for 5 to 15 minutes.

If the heat treatment temperature and time are less than the above range, thermal expansion of the graphene oxide does not sufficiently occur to obtain a high specific surface area. If the heat treatment temperature and time exceed the above range, the yield may be decreased.

Step (b) is a step of heat-treating and thus reducing the thermally-expanded graphene oxide prepared in step (a).

As the additional heat treatment is performed in step (b), a reduction process of the thermally-expanded graphene oxide may occur, thereby finally obtaining a thermally expanded-reduced graphene oxide having a crumpled paper structure.

In addition, the heat treatment may be performed at a temperature of 700 to 1200° C. for 1 to 5 hours, and preferably at a temperature of 800 to 1000° C. for 2 to 4 hours.

If the heat treatment temperature and time are less than the above range, reduction of the thermally-expanded graphene oxide does not sufficiently occur to obtain a high specific surface area. If the heat treatment temperature and time exceed the above range, the yield may be decreased.

The thermally expanded-reduced graphene oxide may have a crumpled paper structure through thermal expansion and reduction steps, thereby exhibiting a high specific surface area and pore volume.

Thermally expanded-reduced graphene oxide prepared by the preparation method of the present invention can be used as a carrier capable of loading sulfur, and has a high specific surface area and pore volume, so that a large amount of sulfur can be evenly loaded. Therefore, a sulfur-carbon composite in which sulfur is loaded on at least a part of the inside and surface of the thermally expanded-reduced graphene oxide can evenly load a large amount of sulfur, and accordingly the reactivity of a lithium secondary battery using it as a positive electrode active material can be improved, and thus excellent initial discharging capacity and lifetime characteristics can be realized.

In more detail, the specific surface area of the thermally expanded-reduced graphene oxide may be 500 to 1200 $m^2/g$, and preferably 700 to 1000 $m^2/g$.

If the specific surface area is 500 to 1200 $m^2/g$, a large amount of sulfur can be evenly loaded onto the thermally expanded-reduced graphene oxide.

In addition, the pore volume of the thermally expanded-reduced graphene oxide may be 3 to 7 $cm^3/g$, and preferably 4 to 6 $cm^3/g$.

If the pore volume is 3 to 7 $cm^3/g$, a large amount of sulfur can be evenly loaded on the thermally expanded-reduced graphene oxide.

Step (c) is a step of preparing a sulfur-carbon composite by mixing the thermally expanded-reduced graphene oxide prepared in step (b) and sulfur.

The thermally expanded-reduced graphene oxide and sulfur are preferably mixed in a weight ratio of 1:1 to 1:9. If the content of the thermally expanded-reduced graphene oxide exceeds the above range, the content of sulfur, which is an active material, is decreased, thereby causing a problem in securing the capacity of the battery. If the content of the thermally expanded-reduced graphene oxide is less than the above range, the content of the thermally expanded-reduced graphene oxide is insufficient to impart electrical conductivity. Therefore, the content of thermally expanded-reduced graphene oxide is properly adjusted within the above range.

The method for preparing the sulfur-carbon composite is not particularly limited in the present invention, and a method commonly used in the art may be used. As an example, a method of simply mixing the thermally expanded-reduced graphene oxide and sulfur and then heat treating them to form a composite may be used. In this case, the heat treatment temperature is not particularly limited as long as it is a temperature at which the sulfur-carbon composite can be prepared.

The sulfur is loaded on at least a part of the surface and inside of the thermally expanded-reduced graphene oxide.

Step (d) is a step of mixing the sulfur-carbon composite prepared in step (c) and carbon nanotube to place the carbon nanotube on the surface of the sulfur-carbon composite, which is a step of preparing a positive electrode active material having a core/shell structure for a lithium secondary battery.

In this case, the core is the sulfur-carbon composite, and the shell is the carbon nanotube.

The mixing of the sulfur-carbon composite and the carbon nanotube may be performed by a wet coating in which the sulfur-carbon composite is mixed with the dispersion of the carbon nanotube, and thus, the carbon nanotube can be uniformly coated on the surface of the sulfur-carbon composite.

The solvent used in the dispersion of the carbon nanotube is not particularly limited as long as it can disperse the carbon nanotube.

The carbon nanotube may be mixed in an amount of 0.5 to 2 parts by weight, preferably 0.7 to 1.5 parts by weight, based on 100 parts by weight of the sulfur-carbon composite. If the carbon nanotube is less than 0.5 parts by weight, it cannot cover the surface of the sulfur-carbon composite which is a core material, so that a positive electrode active material having a core/shell structure cannot be prepared. If the carbon nanotube exceeds 2 parts by weight, the surface of the sulfur-carbon composite may not be uniformly coated, and thus electrical conductivity may not be improved.

In addition, the carbon nanotubes located in the shell contain macro pores and meso pores, and specifically may contain pores of 2 to 200 nm.

As the pores are contained, the transport characteristics of lithium ions and electrons are improved, so that the discharging capacity of the lithium secondary battery, preferably the lithium-sulfur battery, comprising the positive electrode active material of the present invention can be improved.

Lithium Secondary Battery

The present invention relates to a lithium secondary battery comprising a positive electrode; a negative electrode; a separator interposed between the positive electrode and the negative electrode; and an electrolyte solution, wherein the positive electrode comprises the positive electrode active material having the core/shell structure of the present invention as a positive electrode active material.

As the lithium secondary battery of the present invention comprises the positive electrode active material having the core/shell structure of the present invention, the lithium secondary battery of the present invention may be a lithium-sulfur battery.

The positive electrode may include a positive electrode current collector and a positive electrode active material layer coated on one or both surfaces of the positive electrode current collector.

The positive electrode current collector supports the positive electrode active material and is not particularly limited as long as it has high electrical conductivity without causing chemical change in the battery. For example, copper, stainless steel, aluminum, nickel, titanium, palladium, sintered carbon; copper or stainless steel surface-treated with carbon, nickel, silver or the like; aluminum-cadmium alloy or the like may be used as the positive electrode current collector.

The positive electrode current collector can enhance the bonding force with the positive electrode active material by having fine irregularities on its surface, and may be formed in various forms such as film, sheet, foil, mesh, net, porous body, foam, or nonwoven fabric.

The positive electrode active material layer may comprise a positive electrode active material, a binder and an electrically conductive material.

The positive electrode active material comprises the positive electrode active material having the core/shell structure of the present invention.

As described above, the carbon material of the sulfur-carbon composite corresponding to the core of the core/shell structure is the thermally expanded reduced graphene oxide, and as it has a high specific surface area and pore volume, a larger amount of sulfur can be evenly loaded. Therefore, in the present invention, the loading amount of sulfur in the positive electrode may be 2 to 15 mg/cm$^2$, and preferably 6 to 10 mg/cm$^2$. With such high loading amount, the lithium secondary battery including the positive electrode may exhibit effects of improving initial discharging capacity and lifetime characteristics.

The positive electrode may further comprise at least one additive selected from a transition metal element, a group IIIA element, a group IVA element, a sulfur compound of these elements, and an alloy of these elements and sulfur, in addition to the positive electrode active material.

The transition metal element may comprise Sc, Ti, V, Cr, Mn, Fe, Co, Ni, Cu, Zn, Y, Zr, Nb, Mo, Tc, Ru, Rh, Pd, Os, Ir, Pt, Au, Hg and the like, and the group IIIA element may comprise Al, Ga, In, Tl and the like, and the group IVA element may comprise Ge, Sn, Pb, and the like.

The electrically conductive material is intended to improve electrical conductivity and is not particularly limited as long as it is an electrically conductive material that does not cause chemical change in the lithium secondary battery.

Generally, carbon black, graphite, carbon fiber, carbon nanotube, metal powder, electrically conductive metal oxide, organic electrically-conductive material and the like can be used. Products that are currently marketed as conductive materials may comprise acetylene black series (products from Chevron Chemical Company or Gulf Oil Company), Ketjen Black EC series (products from Armak Company), Vulcan XC-72 (a product from Cabot Company) and Super P (a product from MMM). For example, acetylene black, carbon black, graphite, etc. may be used.

In addition, the positive electrode active material layer may further comprise a binder having a function of holding the positive electrode active material on the positive electrode current collector and connecting between active materials. As the binder, for example, various types of binders such as polyvinylidene fluoride-hexafluoropropylene (PVDF-co-HFP), polyvinylidene fluoride (PVDF), polyacrylonitrile, polymethyl methacrylate, styrene-butadiene rubber (SBR), carboxyl methyl cellulose (CMC) and the like can be used.

The positive electrode as described above may be prepared by the conventional method, and specifically, the positive electrode is manufactured by coating and drying a composition for forming the positive electrode active material layer, which is in a slurry state and is prepared by mixing the positive electrode active material, the electrically conductive material and the binder in an organic solvent, onto the current collector, and optionally compression-molding it onto the current collector to improve the electrode density. At this time, as the organic solvent, it is preferable to use one that can uniformly disperse the positive electrode active material, the binder, and the electrically conductive material and that evaporates easily. Specifically, acetonitrile, methanol, ethanol, tetrahydrofuran, water, isopropyl alcohol and the like are exemplified.

The composition for forming the positive electrode active material layer may be coated on the positive electrode current collector using a conventional method known in the art, and for example, various methods such as dipping method, spraying method, roll coating method, gravure printing method, bar coating method, die coating method, comma coating method, or a combination thereof can be used.

The positive electrode active material layer that has gone through such a coating process is then dried through a drying process to evaporate the solvent or dispersion medium, densify the coating film and make the coating film and the current collector close together. At this time, the drying is carried out according to a conventional method and is not particularly limited.

The negative electrode is a lithium-based metal, and may further comprise a current collector on one side of the lithium-based metal. As the current collector, a negative electrode current collector may be used.

The negative electrode current collector is not particularly limited as long as it has high electrical conductivity without causing chemical changes in the battery, and may be selected from the group consisting of copper, aluminum, stainless steel, zinc, titanium, silver, palladium, nickel, iron, chromium, and alloys and combinations thereof. The stainless steel can be surface-treated with carbon, nickel, titanium, or silver, and the alloy may be an aluminum-cadmium alloy. In addition to those, sintered carbon, a non-conductive polymer surface-treated with an electrically conductive material, or an electrically conductive polymer may be used. In general, a thin copper plate is used as a negative electrode current collector.

In addition, the shape of the negative electrode current collector can be various forms such as a film having or not having fine irregularities on a surface, sheet, foil, net, porous body, foam, nonwoven fabric and the like.

In addition, the negative electrode current collector is in the thickness range of 3 to 500 μm. If the thickness of the negative electrode current collector is less than 3 μm, the current collecting effect is lowered. On the other hand, if the thickness exceeds 500 μm, when folding and then assembling the cell, there is a problem that the workability is reduced.

The lithium-based metal may be lithium or a lithium alloy. At this time, the lithium alloy comprises an element capable of alloying with lithium, and specifically may be an alloy of lithium and at least one selected from the group consisting of Si, Sn, C, Pt, Ir, Ni, Cu, Ti, Na, K, Rb, Cs, Fr, Be, Mg, Ca, Sr, Sb, Pb, In, Zn, Ba, Ra, Ge and Al.

The lithium-based metal may be in the form of a sheet or foil, and in some cases, may be in a form in which lithium or a lithium alloy is deposited or coated on a current collector by a dry process or a form in which metal and an alloy in a particle phase are deposited or coated by a wet process or the like.

A conventional separator may be interposed between the positive electrode and the negative electrode. The separator is a physical separator having a function of physically separating the electrodes, and can be used without particular limitation as long as it is used as a conventional separator, and particularly, a separator with low resistance to ion migration in the electrolyte solution and excellent impregnating ability for the electrolyte solution is preferable.

In addition, the separator enables the transport of lithium ions between the positive electrode and the negative electrode while separating or insulating the positive electrode and the negative electrode from each other. The separator may be made of a porous, nonconductive, or insulating material. The separator may be an independent member such as a film or a coating layer added to the positive electrode and/or the negative electrode.

Examples of the polyolefin-based porous film which can be used as the separator may be films formed of any polymer alone selected from polyethylenes such as high density polyethylene, linear low density polyethylene, low density polyethylene, and ultra-high molecular weight polyethylene, and polyolefin-based polymers such as polypropylene, polybutylene, and polypentene, or formed of a polymer mixture thereof.

Examples of the nonwoven fabric that can be used as the separator is a nonwoven fabric formed by a polymer of polyphenyleneoxide, polyimide, polyamide, polycarbonate, polyethyleneterephthalate, polyethylenenaphthalate, polybutyleneterephthalate, polyphenylenesulfide, polyacetal, polyethersulfone, polyetheretherketone, polyester and the like alone or a mixture thereof. Such nonwoven fabrics include a nonwoven fabric in the form of a fiber to form a porous web, that is, a spun-bond or a melt-blown nonwoven fabric composed of long fibers.

The thickness of the separator is not particularly limited, but is preferably in the range of 1 to 100 μm, and more preferably 5 to 50 μm. If the thickness of the separator is less than 1 μm, the mechanical properties cannot be maintained. If the thickness of the separator exceeds 100 μm, the separator acts as a resistive layer, thereby deteriorating the performance of the battery.

The pore size and porosity of the separator are not particularly limited, but it is preferable that the pore size is 0.1 to 50 μm and the porosity is 10 to 95%. If the separator has a pore size of less than 0.1 μm or a porosity of less than 10%, the separator acts as a resistive layer. If the separator has a pore size of more than 50 μm or a porosity of more than 95%, mechanical properties cannot be maintained.

The electrolyte solution is a non-aqueous electrolyte containing lithium salt and is composed of a lithium salt and an electrolyte solution. As the electrolyte solution, a non-aqueous organic solvent, organic solid electrolyte, and inorganic solid electrolyte are used.

As the lithium salt, lithium salts conventionally used in the electrolyte solution for the lithium secondary battery may be used without limitation. The lithium salt may comprise, for example, any one selected from the group consisting of LiSCN, LiBr, LiI, $LiPF_6$, $LiBF_4$, $LiB_{10}Cl_{10}$, $LiSO_3CF_3$, LiCl, $LiClO_4$, $LiSO_3CH_3$, $LiB(Ph)_4$, $LiC(SO_2CF_3)_3$, $LiN(SO_2CF_3)_2$, $LiCF_3CO_2$, $LiAsF_6$, $LiSbF_6$, $LiAlCl_4$, LiFSI, lithium chloroborane, lithium lower aliphatic carboxylate, etc.

In addition, the concentration of the lithium salt in the electrolyte solution may be 0.2 to 2 M, specifically 0.6 to 2 M, and more specifically, 0.7 to 1.7 M. If the concentration of the lithium salt is less than 0.2 M, the conductivity of the electrolyte solution may be lowered and thus the performance of the electrolyte solution may be deteriorated. If the concentration of the lithium salt exceeds 2 M, the viscosity of the electrolyte solution may increase and thus the mobility of lithium ions may be reduced.

The non-aqueous organic solvent should dissolve the lithium salt well, and the non-aqueous organic solvent of the present invention may comprise, for example, aprotic organic solvents such as N-methyl-2-pyrrolidinone, propylene carbonate, ethylene carbonate, butylene carbonate, dimethyl carbonate, diethyl carbonate, ethyl methyl carbonate, gamma-butyrolactone, 1,2-dimethoxyethane, 1,2-diethoxyethane, tetrahydrofuran, 2-methyl tetrahydrofuran, dimethylsulfoxide, 1,3-dioxolane, 4-methyl-1,3-dioxane, diethylether, formamide, dimethylformamide, dioxolane, acetonitrile, nitromethane, methyl formate, methyl acetate, phosphate triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate, and these organic solvents can be used alone or in a mixed solvent form of two or more solvents thereof.

As the organic solid electrolyte, for example, polyethylene derivatives, polyethylene oxide derivatives, polypropylene oxide derivatives, phosphate ester polymers, polyalginate lysine, polyester sulfide, polyvinyl alcohol, polyvinylidene fluoride, and polymers comprising ionic dissociation groups and the like can be used.

As the inorganic solid electrolyte, for example, nitrides, halides, sulfates and the like of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$ may be used.

To the electrolyte of the present invention, for example, pyridine, triethylphosphite, triethanolamine, cyclic ether, ethylene diamine, n-glyme, hexamethyl phosphoric triamide, nitrobenzene derivatives, sulfur, quinone imine dyes, N-substituted oxazolidinone, N,N-substituted imidazolidine, ethylene glycol dialkyl ether, ammonium salt, pyrrole, 2-methoxy ethanol, or aluminum trichloride, etc. may be further comprised for the purpose of improving charging/discharging characteristics, flame retardancy, and the like. In some cases, a halogen-containing solvent such as carbon tetrachloride, ethylene trifluoride or the like can be further comprised for the purpose of imparting nonflammability, and carbon dioxide gas can be further comprised for the purpose of improving storage characteristics at a high temperature, and fluoro-ethylene carbonate (FEC), propene sultone (PRS), fluoro-propylene carbonate (FPC) and the like can be further comprised.

The electrolyte may be used as a liquid electrolyte or also as an electrolyte separator form in a solid state. When used as a liquid electrolyte, a separator made of porous glass, plastic, ceramic, or polymer, etc. is further comprised as a physical separator having a function of physically separating the electrodes.

Hereinafter, preferred examples are presented to facilitate understanding of the present invention. However, it is apparent to those skilled in the art that the following examples are merely illustrative of the present invention and that various changes and modifications can be made within the scope and spirit of the present invention, and also that such changes and modifications fall within the scope of the appended claims.

<Preparation of Positive Electrode Active Material for Lithium Secondary Battery>

EXAMPLE 1

Preparation of Sulfur-Thermally Expanded-Reduced Graphene Oxide Composite/Carbon Nanotube (S—Te-rGO/CNT) Having Core/Shell Structure Graphene oxide (GO, product name SE2430, Sixth Element company) was heat-treated at 400° C. for 10 minutes in an inert atmosphere to prepare thermally-expanded graphene oxide.

The thermally-expanded graphene oxide was heat-treated at 900° C. for 3 hours in an inert atmosphere to prepare thermally expanded-reduced graphene oxide (TE-rGO).

The specific surface area and the pore volume of the thermally expanded-reduced graphene oxide were measured by a 6-point BET (Brunauer-Emmett-Teller) method according to a nitrogen gas adsorption-flow method using a porosimetry analyzer (Belsorp-II mini by Bell Japan Inc.). The specific surface area was 921 $m^2$/g and the pore volume was 5.13 $cm^3$/g.

The thermally expanded-reduced graphene oxide and sulfur were mixed in a weight ratio of 25:75, and then reacted at a temperature of 155° C. for 35 minutes to prepare a sulfur-carbon composite (S—Te-rGO) in which sulfur is loaded on the inside (pore) and surface of TE-rGO.

A dispersion of carbon nanotubes in which carbon nanotubes are dispersed was prepared, and in this case, the carbon nanotubes were contained in an amount of 1 part by weight relative to 100 parts by weight of sulfur-carbon composite.

The dispersion of sulfur-carbon composite and carbon nanotube was mortar-mixed for 5 minutes at room temperature, and then dried at 80° C. for 24 hours to prepare a positive electrode active material (S—Te-rGO/CNT) having a core/shell structure, in which carbon nanotubes were coated on the surface of sulfur-carbon composite.

COMPARATIVE EXAMPLE 1

Preparation of Sulfur-Carbon Composite (S—Te-rGO)

Graphene oxide (GO, product name SE2430, Sixth Element company) was heat-treated at 400° C. for 10 minutes in an inert atmosphere to prepare thermally-expanded graphene oxide.

The thermally-expanded graphene oxide was heat-treated at 900° C. for 3 hours in an inert atmosphere to prepare thermally expanded-reduced graphene oxide (TE-rGO).

The specific surface area and the pore volume of the thermally expanded-reduced graphene oxide were measured by a 6-point BET (Brunauer-Emmett-Teller) method according to a nitrogen gas adsorption-flow method using a porosimetry analyzer (Belsorp-II mini by Bell Japan Inc.). The specific surface area was 921 $m^2/g$ and the pore volume was 5.13 $cm^3/g$.

The thermally expanded-reduced graphene oxide and sulfur were mixed in a weight ratio of 25:75, and then reacted at a temperature of 155° C. for 35 minutes to prepare a sulfur-carbon composite (S-TE-rGO) in which sulfur is loaded on the inside (pore) and surface of TE-rGO.

EXPERIMENTAL EXAMPLE 1

Measurement of Initial Discharging Capacity and Lifetime Characteristics of Lithium-Sulfur Battery The positive electrode active materials prepared in Example 1 and Comparative Example 1 respectively were used to prepare lithium-sulfur batteries.

Each of the positive electrode active materials, an electrically conductive material, and a binder were mixed using a ball mill to prepare a slurry for a positive electrode active material. At this time, carbon black was used as the electrically conductive material and polyethylene oxide (molecular weight 5,000,000 g/mol) was used as the binder, and the mixing ratio was 90:5:5 in a weight ratio of positive electrode active material:electrically conductive material:binder. The slurry for the positive electrode active material was applied to an aluminum current collector and dried to prepare a positive electrode.

At this time, the loading amount of sulfur in the positive electrode active material was 6 $mg/cm^2$.

A thin film of lithium metal having a thickness of 40 pm was used as a negative electrode.

The prepared positive electrode and the negative electrode were positioned to face each other, and a polyethylene separator was placed therebetween, and an electrolyte solution was injected to prepare a coin-type lithium-sulfur battery.

As the electrolyte solution, a mixture of DOL (1,3-dioxolane):DEGDME (diethylene glycol dimethyl ether) =4:6 (v/v) in which 1M LiFSI and 1 wt. % $LiNO_3$ are dissolved was used.

1-1. Measurement of Initial Discharge Capacity

The lithium-sulfur batteries prepared above were tested for change in charging/discharging characteristics using a charging/discharging measuring device. The obtained batteries were examined for the initial capacity under 0.1 C/0.1 C charging/discharging conditions, and the results are shown in FIG. 1.

The initial discharging capacity of the lithium-sulfur battery including the positive electrode active material of Comparative Example 1 was measured to be less than 1200 mAh/g, but the initial discharging capacity of the lithium-sulfur battery including the positive electrode active material of Example 1 was measured to be about 1200 mAh/g.

From this, it was confirmed that even if the thermally expanded-reduced graphene oxide is used as a carbon material of the sulfur-carbon composite, the initial discharging capacity is not improved unless carbon nanotubes are contained on the surface of the sulfur-carbon composite.

That is, it can be seen that the positive electrode active material of the present invention having a core/shell structure, in which carbon nanotubes which form a shell are placed on the surface of the sulfur-carbon composites which form a core, improves electrical conductivity due to the inclusion of the carbon nanotubes, thereby improving the initial discharging capacity of a lithium-sulfur battery comprising the same.

1-2. Measurement of Lifetime Characteristics

For the lithium-sulfur battery prepared above, lifetime characteristics was measured by repeatedly charging/discharging at 0.1 C/0.1 C for the first 3 cycles, charging/discharging at 0.2 C/0.2 C for 3 cycles, and then charging/discharging at 0.3 C/0.5 C for 50 cycles using a charging/discharging measuring device, and the results are shown in FIG. 2.

In the case of the lithium-sulfur battery including the positive electrode active material of Comparative Example 1, the discharging capacity of the 0.5 C high-rate section was measured to be 600 mAh/g or less, and there was a phenomenon in which charging was not completely performed. On the other hand, in the case of the lithium-sulfur battery containing the positive electrode active material of Example 1, the overvoltage, which causes premature degradation of the lifetime, did not occur, there was no phenomenon that the charging capacity was lowered, and even if the cycle was repeated, it showed a result of maintaining the capacity.

From this, it was confirmed that even if the thermally expanded-reduced graphene oxide is used as a carbon material of the sulfur-carbon composite, if carbon nanotubes are not included on the surface of the sulfur-carbon composite, the transport characteristics of lithium ions and electrons are not improved, the discharging capacity in the high-rate section is not improved, and the charging is not completely performed.

That is, it can be seen that the positive electrode active material of the present invention having a core/shell structure, in which carbon nanotubes which form a shell are placed on the surface of the sulfur-carbon composites which form a core, improves the transport characteristics of lithium ions and electrons due to the inclusion of the carbon nanotubes, thereby improving the discharging capacity in a high rate section of the lithium-sulfur battery comprising the same, and improving lifetime characteristics.

The invention claimed is:

1. A positive electrode active material having a core/shell structure for a lithium secondary battery, comprising:
   a core comprising a sulfur-carbon composite; and
   a shell comprising carbon nanotubes on a surface of the core,
   wherein the sulfur-carbon composite comprises thermally expanded-reduced graphene oxide,
   wherein sulfur is present on at least a part of a surface of the thermally expanded-reduced graphene oxide and inside of the thermally expanded-reduced graphene oxide, and
   wherein the thermally expanded-reduced graphene oxide has a crumbled paper structure,
   wherein a specific surface area of the thermally expanded-reduced graphene oxide is 700 $m^2/g$ to 1200 $m^2/g$,
   wherein a pore volume of the thermally expanded-reduced graphene oxide is 4 $cm^3/g$ to 7 $cm^3/g$, and
   wherein the thermally expanded-reduced graphene oxide does not have a stacked structure.

2. The positive electrode active material having the core/shell structure for the lithium secondary battery according to claim 1, wherein the carbon nanotube is present in an amount of 0.5 parts by weight to 2 parts by weight relative to 100 parts by weight of the sulfur-carbon composite.

3. The positive electrode active material having the core/shell structure for the lithium secondary battery according to claim 1, wherein the shell comprising the carbon nanotubes comprises pores having a size of 2 nm to 200 nm.

4. The positive electrode active material having the core/shell structure for the lithium secondary battery according to claim 1, wherein the thermally expanded-reduced graphene oxide and sulfur are mixed in a weight ratio of 1:1 to 1:9.

5. The positive electrode active material having the core/shell structure for the lithium secondary battery according to claim 1, wherein the positive electrode active material for the lithium secondary battery is suitable for use as a positive electrode active material for a lithium-sulfur battery.

6. A method for preparing a positive electrode active material having a core/shell structure for a lithium secondary battery according to claim 1, comprising the steps of:

(a) thermally expanding graphene oxide by heat treatment at a temperature in a range of 300° C. to 500° C. to prepare a thermally-expanded graphene oxide;
   (b) reducing the thermally-expanded graphene oxide by heat treatment at a temperature in a range of 700° C. to 1200° C. to prepare a thermally expanded-reduced graphene oxide;
   (c) mixing the thermally expanded-reduced graphene oxide and sulfur to prepare a sulfur-carbon composite; and
   (d) mixing the sulfur-carbon composite and carbon nanotubes to form carbon nanotubes on a surface of the sulfur-carbon composite.

7. The method for preparing the positive electrode active material having the core/shell structure for the lithium secondary battery according to claim 6, wherein the thermal expansion in step (a) is performed for 5 minutes to 30 minutes.

8. The method for preparing the positive electrode active material having the core/shell structure for the lithium secondary battery according to claim 6, wherein the reduction in step (b) is performed for 1 hours to 5 hours.

9. The method for preparing the positive electrode active material having the core/shell structure for the lithium secondary battery according to claim 6, wherein the carbon nanotubes in step (d) are mixed in an amount of 0.5 parts by weight to 2 parts by weight relative to 100 parts by weight of the sulfur-carbon composite.

10. A lithium secondary battery, comprising:
   a positive electrode;
   a negative electrode;
   a separator interposed between the positive electrode and the negative electrode; and
   an electrolyte solution,
   wherein the positive electrode comprises the positive electrode active material of claim 1.

11. The lithium secondary battery according to claim 10, wherein a loading amount of sulfur in the positive electrode is 2 $mg/cm^2$ to 15 $mg/cm^2$.

12. The lithium secondary battery according to claim 10, wherein the lithium secondary battery is a lithium-sulfur battery.

* * * * *